May 19, 1925.
J. R. GAMMETER
BEAD CORE
Filed Feb. 5, 1923
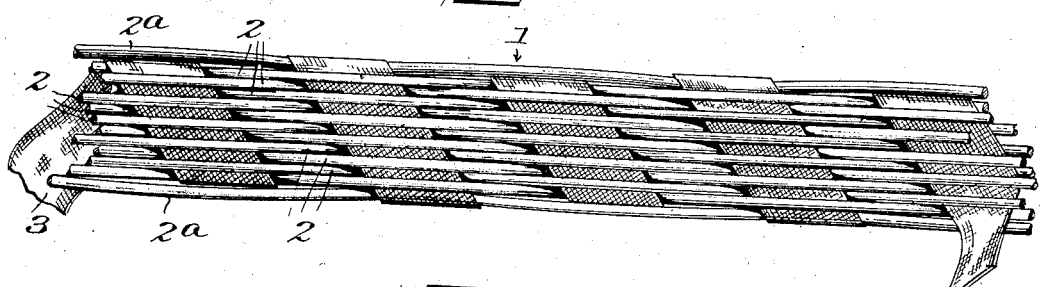
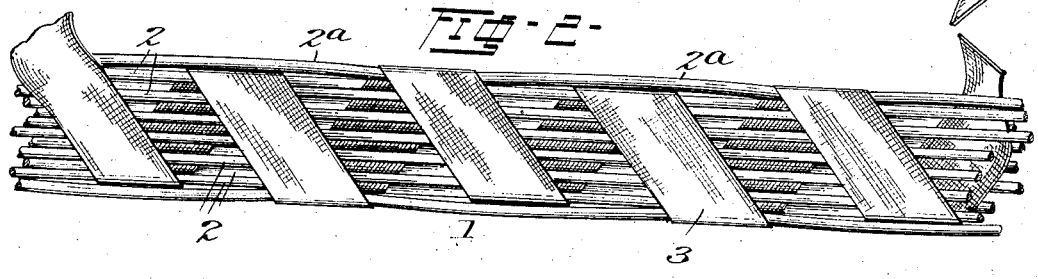
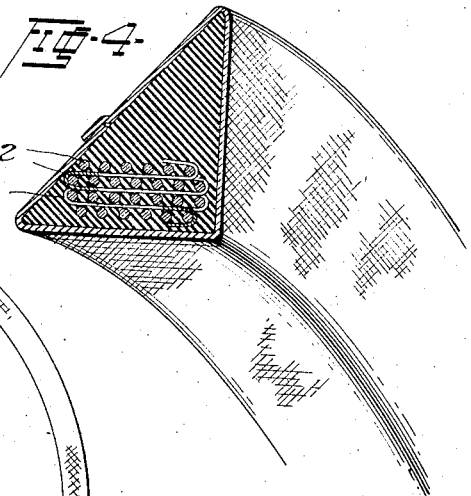
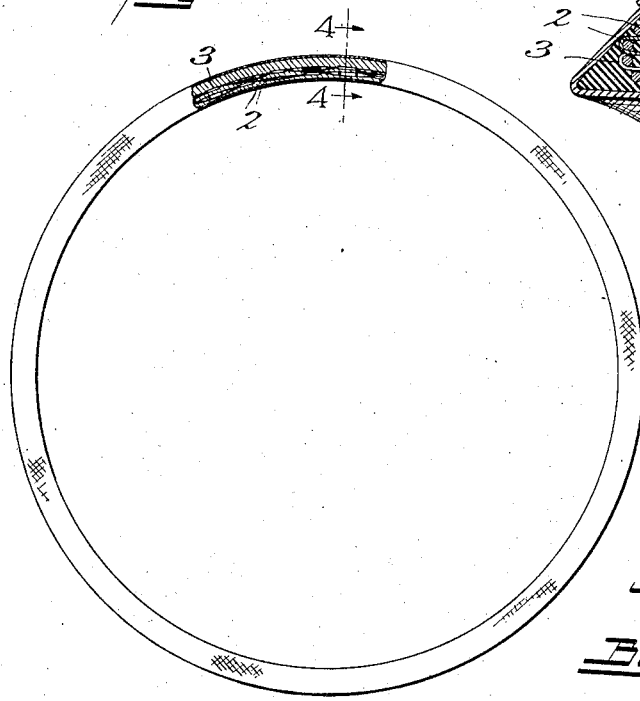
Inventor
John R. Gammeter.
By
Atty.

Patented May 19, 1925.

1,538,430

UNITED STATES PATENT OFFICE.

JOHN R. GAMMETER, OF AKRON, OHIO, ASSIGNOR TO THE AMERICAN CHAIN COMPANY, OF BRIDGEPORT, CONNECTICUT, A CORPORATION OF CONNECTICUT.

BEAD CORE.

Application filed February 5, 1923. Serial No. 616,934.

*To all whom it may concern:*

Be it known that I, JOHN R. GAMMETER, a citizen of the United States, residing at Akron, in the county of Summit and State of Ohio, have invented certain new and useful Improvements in Bead Cores, of which the following is a specification.

The present invention relates to improvements in reinforcement such as used in beads for pneumatic tires and it seeks, broadly, to provide a structure that is adapted to be more securely anchored in a bead ring than other forms of bead cores.

My invention is also directed toward providing a bead core embodying a number of individually flexible wires which are arranged in parallel relationship to impart inextensibility to the bead, and are held in that relation by a flexible tape of a suitable material which can be easily and rapidly woven or wrapped about the wires to maintain them in parallel relationship.

A further object of my invention is to provide a bead core that is formed of wire strands joined together by a fabric tape impregnated with rubber, which tape is woven into the strands so that it is adapted to unite with the rubber of a bead ring to anchor the reinforcement in the bead.

Other and ancillary purposes of my invention are the provision of a bead reinforcement that may be woven upon a circular loom and produced more quickly than other forms of reinforcement and at a relatively smaller cost.

Further objects and advantages will presently become apparent when the following description of my invention is read and upon reference to the accompanying drawings and the claims appended hereto.

In the drawings:

Figure 1 is a fragmentary view of one side of a composite, flat strip from which I form my novel bead core or reinforcement;

Fig. 2 is a similar view of the other side of the strip;

Fig. 3 is a diagrammatic view illustrating a bead ring with my novel core incorporated therein; and Fig. 4 is a transverse sectional view, drawn on an enlarged scale and taken on the line 4—4 of Fig. 3.

Referring to the drawings, the numeral 1 designates a portion of a flat woven strip which I propose to wind convolutely to form a bead core comprising a number of layers. In the drawing, four layers are shown in Fig. 4, but this number may be increased or diminished in accordance with the size of the bead or the strength of reinforcement required, as will be understood.

The strip 1 is constructed in its preferred form of a number of parallel wire strands 2, as shown in the drawings, which are spaced apart across the strip as desired. The wire strands are preferably formed from drawn steel wire and the outer wires $2^a$ may be of slightly heavier gage or greater tensile strength as desired. The strands 2 form the warp of the strip and are held together by a continuous weft element 3. I prefer to utilize a tape of rubberized or rubber impregnated fabric for this purpose, although I may elect to use other materials and a different form of tape than that shown in the drawings. If rubberized fabric is used, the rubber compound in the bead will adhere thereto, but in all events the flexible fabric will take all or practically all of the crimp in the weaving of the strip.

The weft tape 3 is preferably woven alternately through the strands and then passed across them in an open spiral path so that it alternately embraces all of the strands and then passes across those intermediate the outside strands. It may, however, be otherwise woven if desired, but the particular weave shown is especially adaptable as a product of a circularly-acting shuttle in the weaving machine.

A bead core constructed in this manner is inextensible and is especially adapted for incorporation in a tire bead as the fabric forms a firm anchorage for the rubber of the bead. My form of core provides for the required resistance against stretching and for sufficient flexibility in a tire bead to permit it to be more readily removed from a rim than tires having other bead cores therein. Moreover, as will now be seen, the weft element of my invention through vulcanization thoroughly binds the wire strands of each layer in proper relation and unites the layers of the core into a composite structure. Furthermore, my novel weft element anchors the strands in the bead ring in an improved manner and partially surrounds them so that they will not cut into the surrounding rubber. This strip, it will be seen, may be woven in a circular loom, which is also an advantage, as such looms operate quicker than those of the reciprocating type.

Although I have shown and described one preferred embodiment of my invention, it is to be understood that changes and modifications may be resorted to within the scope of the appended claims and without departing from the spirit of the invention.

What I claim is:

1. As an article of manufacture, an annular bead core comprising circumferential inextensible strands, and flexible non-metallic elements traversing the strands at intervals throughout the circumference of the core to hold the strands together in parallel, flat relationship.

2. As an article of manufacture, an annular bead core comprising circumferential inextensible wires, and a fabric tape interwoven with the wires to hold them in parallel relationship.

3. As an article of manufacture, bead reinforcing material comprising circumferential strands of inextensible material, and strips of rubber impregnated material, the strands and strips being woven together.

4. As an article of manufacture, a bead reinforcing element comprising layers of inextensible strands, and strips of fabric woven across the strands.

5. As an article of manufacture, an annular bead comprising a reinforcing element formed of circumferential inextensible wires, and a strip of textile material traversing the wires and interwoven therewith.

6. As an article of manufacture, an annular bead core comprising a series of layers formed of inextensible circumferential strands, and a continuous strip of fibrous material woven into the strands.

7. As an article of manufacture, an annular bead core comprising a series of layers formed of inextensible circumferential strands, and a continuous strip of fabric traversing the strands and holding them in parallel flat relationship.

8. As an article of manufacture, a bead core comprising convolute windings of metallic strands, and a continuous strip of textile material woven into the strands.

9. As an article of manufacture, a bead core comprising a series of parallel inextensible strands, and a single strip of textile material to hold the strands in parallel flat relationship.

10. As an article of manufacture, a bead core formed from a convolutely wound strip, said strip comprising parallel wires, and a strip of textile material woven into the wires to hold them in parallel relationship.

11. As an article of manufacture, a bead core formed from convolute windings of composite strip material, said strip comprising a series of inextensible strands, and a strip of rubber impregnated material woven in a spiral path through the strands.

12. As an article of manufacture, a bead reinforcing element of convolute windings of composite strip material, said strip comprising inextensible parallel wires, and a strip of rubberized fabric woven across the wires.

13. As an article of manufacture, a bead reinforcing element of convolute windings of composite strip material, said strip comprising parallel inextensible strands, and a strip of textile material woven into the strands at intervals to hold them together.

14. As an article of manufacture, a bead reinforcing element of convolute windings of composite strip material, said strip comprising parallel wires, and a continuous strip of fabric woven into the strands.

15. As an article of manufacture, a bead core formed from convolute windings of composite strip material, said strip comprising longitudinal wire strands, and a strip of fabric woven into the strands to embrace all of the strands at intervals and some of the strands at other intervals.

16. A strip of material for use in forming a bead core, comprising parallel wire strands, and a flat tape woven through said strands.

17. A strip of material for use in forming a bead core, comprising longitudinal wire strands, and a flat tape woven through the strands from side to side and serving to hold them in parallel relationship.

18. A strip of material for use in forming a bead core, comprising longitudinal inextensible wires, and a flat tape woven through the wires at intervals and passing across the strands at other intervals.

JOHN R. GAMMETER.